Jan. 28, 1941.  A. B. MUELLER  2,229,761
PROJECTION APPARATUS AND CENTRALIZED CONTROL SYSTEM THEREFOR
Filed March 18, 1938  5 Sheets-Sheet 2

INVENTOR
*Albert B. Mueller*
BY
*Ward, Crosby & Neal*
ATTORNEYS

Patented Jan. 28, 1941

2,229,761

UNITED STATES PATENT OFFICE 2,229,761

PROJECTION APPARATUS AND CENTRALIZED CONTROL SYSTEM THEREFOR

Albert B. Mueller, Clifton, N. J., assignor to General Printing Ink Corporation, New York, N. Y., a corporation of Delaware Application March 18, 1938, Serial No. 196,602

10 Claims. (Cl. 88—24)

My invention relates to a projection apparatus and, more particularly, my invention has reference to a control system for effecting desired adjustments of such apparatus.

My invention, in an important phase thereof, relates to a projection apparatus having various control devices which are grouped for convenient manual operation adjacent the zone occupied by the sensitized surface of said projection apparatus.

Further, my invention relates to various novel devices for effecting desired adjustments as regards parts of the optical system.

Various other objects, advantages and characteristics of my invention will become apparent from the following detailed description:

My invention resides in the projection apparatus, centralized control arrangement, combinations and arrangements of the character hereinafter described and claimed.

For an understanding of my invention and for an illustration of one of the forms thereof, reference is to be had to the accompanying drawings, in which:

Fig. 3 is a transverse vertical sectional view, partly in elevation, taken on the line 3—3 of Fig. 1 looking in the direction of the arrows;

As shown on the drawings, the projection apparatus of my invention comprises a plurality of open frames 1 utilizable for supporting purposes, four of these frames 1 being alined longitudinally at each side of the machine and said frames 1 being alined in pairs transversely of the machine. Suspended from the top section of each frame 1 is a spring structure 2 and each pair of these transversely alined spring structures 2 carries a transverse member 3. These transverse members 3 support a longitudinally extending frame formed from four tubes or rods 4 so positioned that they form upper and lower pairs, all of said tubes 4 being disposed in parallel relation and the tubes 4 of each pair being horizontally alined. These tubes 4 are maintained in fixed frame-forming relation by transversely extending structures 5 disposed in parallel relation with respect to each other.

Figures 7, 8, 9:
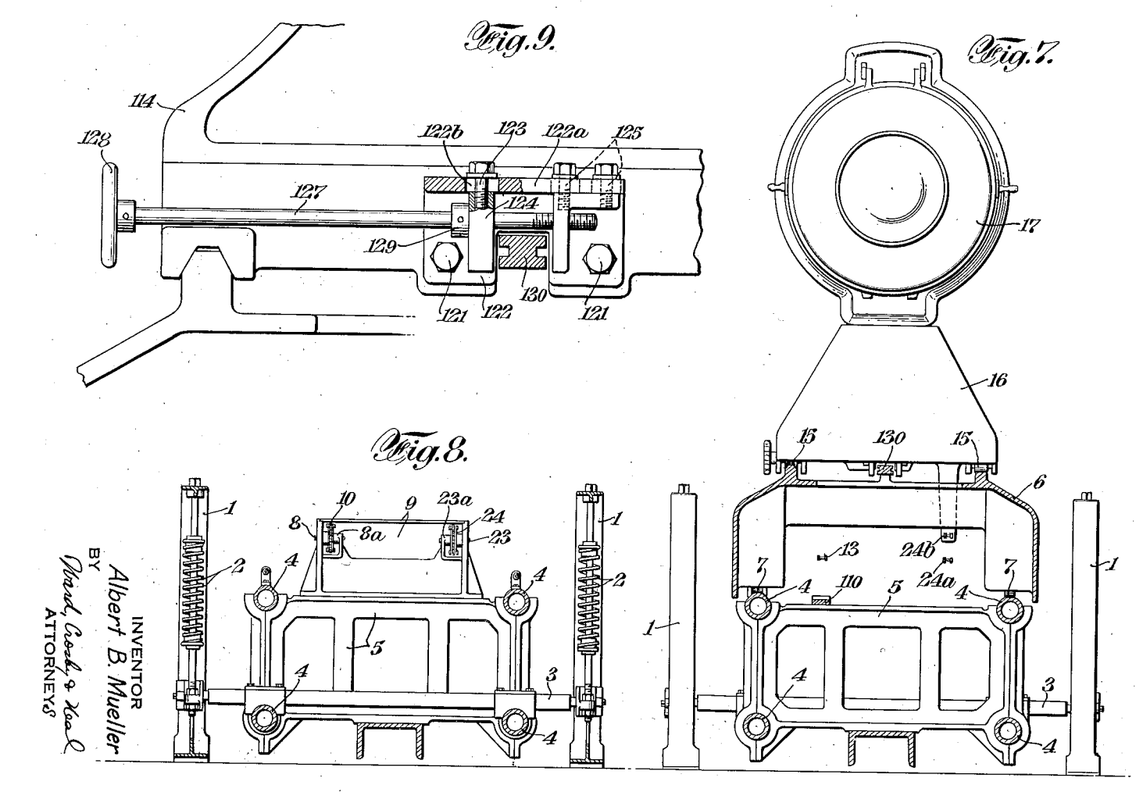
Fig. 7 is a transverse vertical sectional view, partly in elevation, taken on the line 7—7 of Fig. 1 looking in the direction of the arrows.
Fig. 8 is a transverse vertical sectional view, partly in elevation, taken on the line 8—8 of Fig. 1 looking in the direction of the arrows.
Fig. 9 is a vertical sectional view, partly in elevation, showing a form of locking mechanism.
Figure 10:
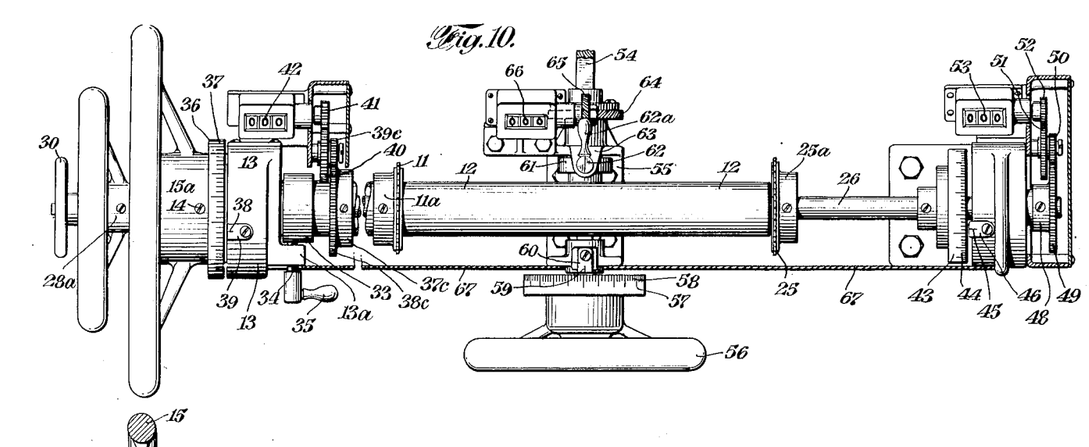
Fig. 10 is a plan view showing a mechanical operating device as constructed in accordance with my invention.

Disposed above the frame formed by the tubes 4 is a carriage 6, which, at each side thereof, carries a plurality of wheels or rollers 7 engageable, respectively, with the upper pair of tubes 4 which, as clearly appears from Fig. 7, serve as a trackway along which said carriage 6 is movable.

Figures 1, 2:
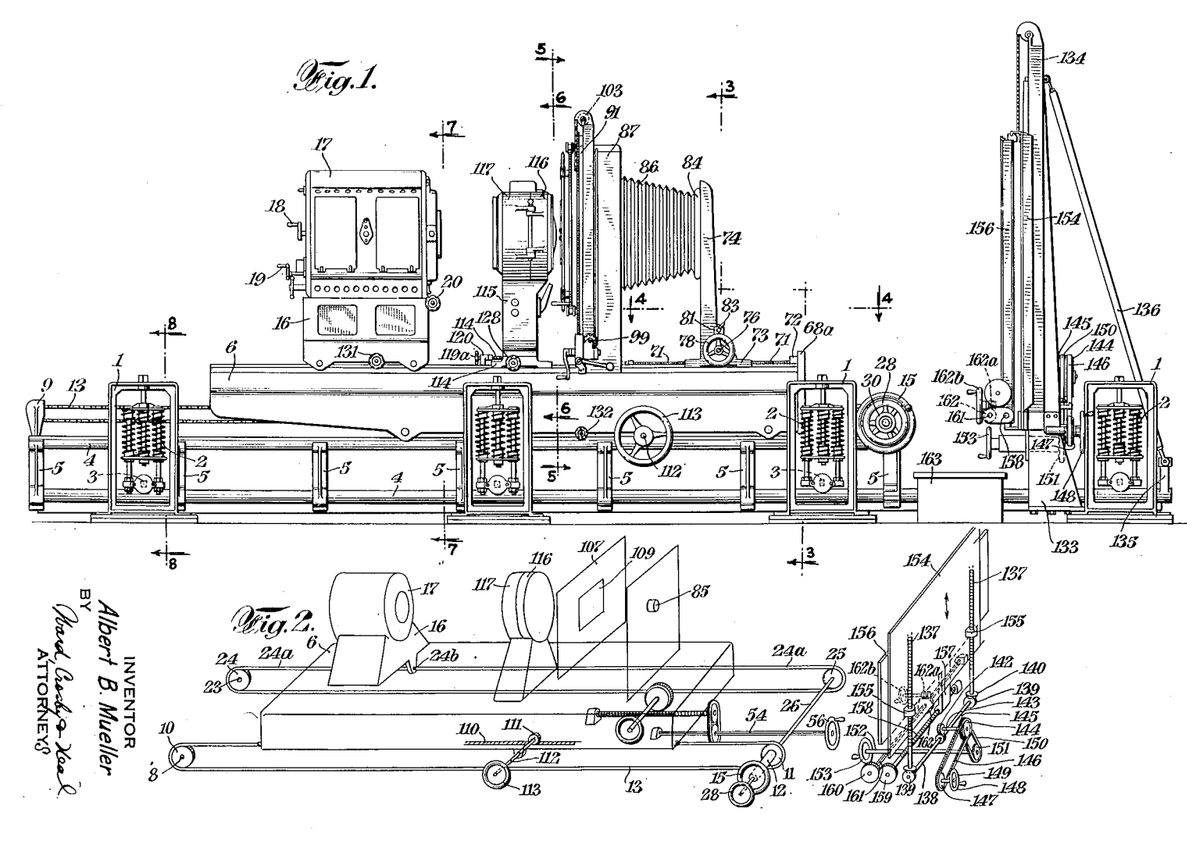
Figure 1 is a side elevational view of a projection apparatus as constructed in accordance with my invention.
Fig. 2 is a diagrammatic perspective view, with parts omitted, of the arrangement shown in Fig. 1.

In accordance with the invention, the carriage 6 is controlled for to-and-fro movement in a novel manner. To this end, as shown in Figs. 2 and 8, a shaft 8 is horizontally mounted on a bracket 8a and in one side of a housing 9 upstanding from and secured to that structure 5 at the left, Fig. 1, said shaft 8 having a sprocket wheel 10 rotatable therewith. Disposed in alinement, longitudinally of the machine, with this sprocket wheel 10 is a second sprocket wheel 11, Figs. 2, 11 and 12, which has its hub 11a secured to and rotatable with a sleeve 12, Fig. 12, this sleeve 12 being journalled in a bearing formed by a bearing bracket 13 secured to that transverse structure 5 at the right, Fig. 1, and said sleeve 12 having secured to one end thereof, as by a set screw 14, the hub 15a of a hand wheel 15. Coactable with the sprocket wheels 10 and 11 is an endless sprocket chain 13 which, in suitable manner, for example, as indicated at 14, Fig. 2, is anchored to the aforesaid carriage 6.

As clearly illustrated in Figs. 1, 2 and 7, the aforesaid carriage 6 is of such character that the upper surface thereof forms a pair of spaced tracks 6a, 6a with which coact the respective sets of wheels 15 suitably journalled in the lower housing 16 of an arc lamp which is received in an upper housing 17. This arc lamp may be of any well known type. It comprises suitable mechanism controlled by an actuating handle 18 for positioning the positive carbon, other mechanism controlled by an actuating handle 19 for positioning the positive and negative carbons, other mechanism controlled by a hand wheel 20 for swinging the lamp house, etc.

In accordance with the invention, the arc lamp housing structure 16, 17 is controlled for to-and-fro movement in a novel manner. To this end, as shown in Fig. 8, a shaft 23 is horizontally mounted on a bracket 23a and on one side of the aforesaid housing 9, said shaft 23 having a sprocket wheel 24 rotatable therewith. Disposed in alinement, longitudinally of the machine, with the sprocket wheel 24 is another sprocket wheel 25, Figs. 2, 11 and 12, which has its hub 25a secured to and rotatable with a shaft 26, one end of which is journalled in a bearing formed by a bearing bracket 27 secured to that transverse structure 5 at the right, Fig. 1, the other end of said shaft 26 being journalled in the aforesaid sleeve 12. At its end removed from the bracket 27, the shaft 26 has secured thereto the hub 28a of a hand wheel 28, Fig. 12. Coactable with the sprocket wheels 24 and 25 is a sprocket chain 24a which, in suitable manner, for example, as indicated at 24b, Fig. 2, is anchored to the aforesaid lower housing 16 of the arc lamp structure.

The shaft 26, at the end thereof to which the hand wheel 28 is secured, is provided with a longitudinally extending passage which is internally threaded to receive a threaded shank 29 to which, at the end thereof to the left, a hand wheel 30 is secured. At its opposite end, the shank 29 comprises a conical surface 29a coactable with the inner ends of a plurality of dogs 31 having their outer ends received, respectively, in passages formed in the respective shoes 32 which are coactable with the aforesaid hub 15a of the hand wheel 15. As will be understood, when the hand wheel 30 is rotated to a sufficient extent in the proper direction, the dogs 31 cause the shoes 32 to frictionally engage the hub 15a of the hand wheel 15 whereby the shaft 26 is releasably locked to the sleeve 12 for the useful purpose hereinafter to be described.

The above described sleeve 12 has secured thereto a collar 33 with which is coactable a screw shank 34 having a handle 35, said screw shank 34 being threaded through a lug 13a extending laterally from the aforesaid bearing bracket 13.

Figure 11:
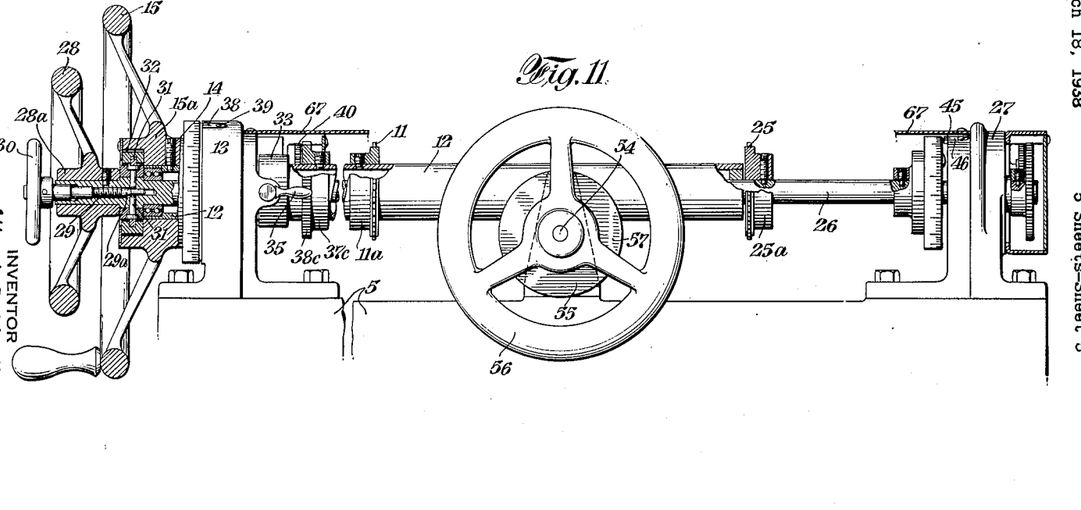
Fig. 11 is an elevational view, partly in section, showing the operating device of Fig. 10.

Further, the sleeve 12 has secured thereto another collar 36 having inscribed thereon a scale 37 which is cooperative with an index 38 marked on a member 39 secured to the aforesaid bracket 13, Fig. 11.

Still further, the sleeve 12 has secured thereto a hub 37c which carries a gear wheel 38c meshing with a gear wheel 39c mounted on a shaft which carries another gear wheel 40, the gear wheels 39c and 40 being connected together for movement as a unit. The gear wheel 40 meshes with and drives a gear wheel 41 which operates suitable counter mechanism 42 provided for the purpose hereinafter described.

The aforesaid shaft 26 has secured thereto a collar 43 which has inscribed thereon a scale 44 cooperative with an index 45 marked on a member 46 secured to the aforesaid bracket 47, Fig. 11.

Further, the shaft 26 has secured thereto a hub 48 which carries a gear wheel 49 disposed in meshing relation with respect to a gear wheel 50 mounted on a shaft which carries another gear wheel 51, the gear wheels 50 and 51 being connected together for movement as a unit. The gear wheel 51 meshes with and drives a gear wheel 52 which operates suitable counter mechanism 53 provided for the purpose hereinafter described.

Referring to Figs. 3, 11 and 12, one end of a shaft 54 of rectangular or other polygonal configuration is shown as mounted in a bearing formed by a bracket 55 suitably secured to one of the aforesaid structures 5, the other end of said shaft being mounted in a suitable fixed bearing, for example, as shown in Fig. 2. One end of this shaft 54 has a hand wheel 56 secured thereto and this same end of the shaft carries a collar 57 having inscribed thereon a scale 58 which is cooperative with an index 59 marked on a member 60 secured to the aforesaid bracket 55.

The shaft 54 carries a second collar 61 with which coacts one end of a shaft 62 threaded in a section 63 extending laterally from the aforesaid bearing bracket 55, said shaft 62 having an actuating handle 62a secured thereto and projecting therefrom.

Further, the shaft 54 carries a gear wheel 64 which meshes with and drives a gear wheel 65 utilizable for operating suitable counter mechanism 66 provided for the purpose hereinafter described.

Figure 4:
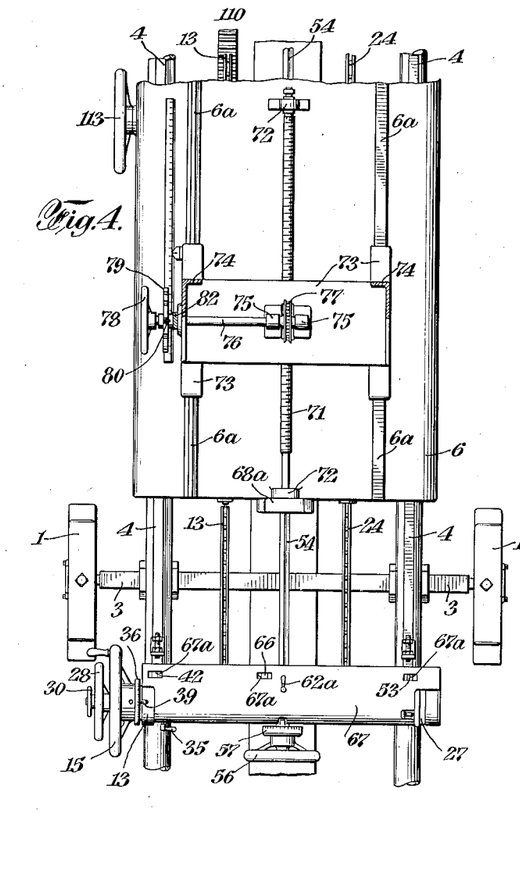
Fig. 4 is a plan view, partly in section, taken on the line 4—4 of Fig. 1 looking in the direction of the arrows.

As illustrated in Figs. 4, 11 and 12, a housing 67 generally angular in cross-section and formed from sheet material is secured in fixed position so that it extends longitudinally of the sleeve 12 and shaft 26, the top section of this housing 67 overlying the above described operating devices for the respective counter mechanisms and said housing top section comprising openings 67a through which the counter mechanisms per se may be observed.

Referring to Fig. 3, the end of the square shaft 54 opposite the aforesaid hand wheel 56 has a gear wheel 68 freely slidable thereon, this sliding movement occurring because said gear wheel 68 is movable with a housing 68a depending from and carried by the forward end of the aforesaid carriage 6.

The gear wheel 68 is engaged by and drives a sprocket chain 69 maintained under tension by suitable pivoted chain-tightening mechanism 69a, Fig. 3. The sprocket chain 69 in turn, drives a gear wheel 70 secured to and rotatable with a worm 71 mounted for rotatable movement in bearings 72 projecting upwardly from and secured to the carriage 6, Fig. 4.

Slidable on the aforesaid tracks 6a, 6a of the carriage 6 is a support 73 having extending upwardly therefrom a pair of spaced standards 74 utilizable as hereinafter described for supporting the objective lens of the herein described projection apparatus. Upstanding from the support 73 are a pair of spaced bearing blocks 75 rotatably supporting a shaft 76 which extends horizontally through a bearing formed in one of the standards 74. Directly above the aforesaid worm 71, the shaft 76 carries a worm wheel 77 which meshes with said worm 71. At its end beyond the last named standard 74, the shaft 76 carries a hand wheel 78 and a locking wheel 79 having notches 79a with which is coacted a latch 80 adapted to be locked in position by a wheel 80a, said latch 80 being mounted in a housing 81 slidably carried by a member 82 suitably supported by said last named standard 74. Associated with the housing 81 is a member 83 utilizable for operating a cam, not shown, to raise and lower said housing 81. As shown in Fig. 3, a pointer 83a carried by the support 73 coacts with a scale 73a secured to the carriage 6 whereby the location of the support 73 as regards said carriage 6 may readily be ascertained.

As shown in Fig. 3, the aforesaid standards 74 support a frame 84 utilizable for retaining the objective lens 85 in operative position. Extending toward the rear of the machine from the objective lens 85 is the usual bellows structure 86 which has its front end secured to the frame 84 and which has its rear end secured to an upstanding frame 87 suitably anchored to the aforesaid carriage 6, as by the bolts 88, Fig. 5.

Projecting laterally from the lower section of the frame 87 are the rollers 89 which support an assembly 90 for horizontal movement, this assembly 90 comprising a vertical plate 91 which rests directly upon said rollers 89 and which is maintained in a vertical plane for horizontal sliding movement by lower retaining members 89a and upper retaining members, not shown, all of said retaining members being carried by said frame 87. The plate 91 carries a pair of spaced depending brackets 92, these brackets forming bearings for a shaft 93 carrying an actuating handle 93a, the shaft 93 being threaded through an internally threaded nut device 94 fixed to said frame 87. Accordingly, by rotation of the handle 93a, the assembly 90 may be moved horizontally in one direction or the other with respect to the frame 87, and the extent of this movement may be determined by observing a cooperating pointer and scale carried by the respective members 95, 96 secured, respectively, to the plate 91 and to the frame 87.

Forming a part of the assembly 90 and slidable on the plate 91 is a plate 97 which is guided for vertical movement in any suitable manner, as by cooperating blocks and standards, not shown. Journalled in the plate 91 is the shaft for an actuating handle 98, Fig. 5, which, by suitable gear mechanism, operates a shaft 99, Fig. 1, this shaft controlling suitable chains, or equivalent, for imparting vertical movement to said plate 97. Accordingly, by rotation of the handle 98, the plate 97 may be moved vertically in one direction or the other and the extent of this movement may be determined by observing a cooperating pointer and scale carried by the respective members 100, 101 secured, respectively, to the plates 97 and 91.

As indicated on the drawings, chains 102 are secured to the plate 97 and these chains extend over the respective rollers 103 so as to support suitable weights, not shown, utilizable for counter-balancing the plate 97 and the parts carried thereby.

Projecting laterally from the plate 97 are the upper and lower sets of rollers 103 which slidably support, for horizontal movement, a plate 104 which, in turn, carries a plurality of laterally extending rollers 105 utilizable for rotatably supporting a plate 106 to which, in suitable manner, is detachably secured a frame 107 adapted, by means comprising the clamps 108, to detachably support a printing plate 109.

Figure 5:
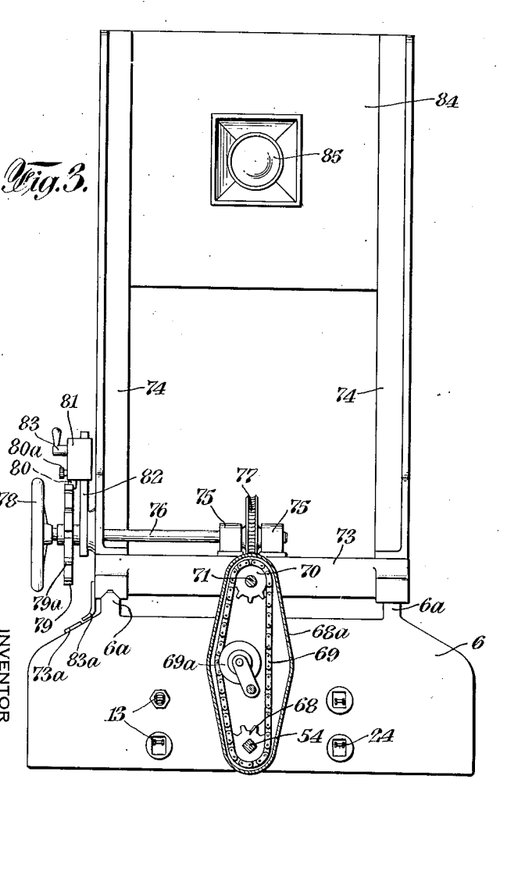
Fig. 5 is a transverse sectional view, partly in elevation, taken on the line 5—5 of Fig. 1 looking in the direction of the arrows.

In a detailed manner above, I have described a manually operable arrangement utilizable for moving the carriage 6 in a desired manner. If desired, supplementary carriage-moving means may be employed and, as shown in Figs. 1, 2 and 5, this means last named may comprise a fixed rack 110 which extends horizontally in a direction parallel with respect to the aforesaid tubes 4, this rack 110 having cooperable therewith a gear wheel 111 which is secured to and rotatable with a shaft 112 mounted in bearings associated with the carriage 6, this shaft 112, exteriorly of said carriage 6, having an operating wheel 113 secured thereto.

Figures 5, 6:
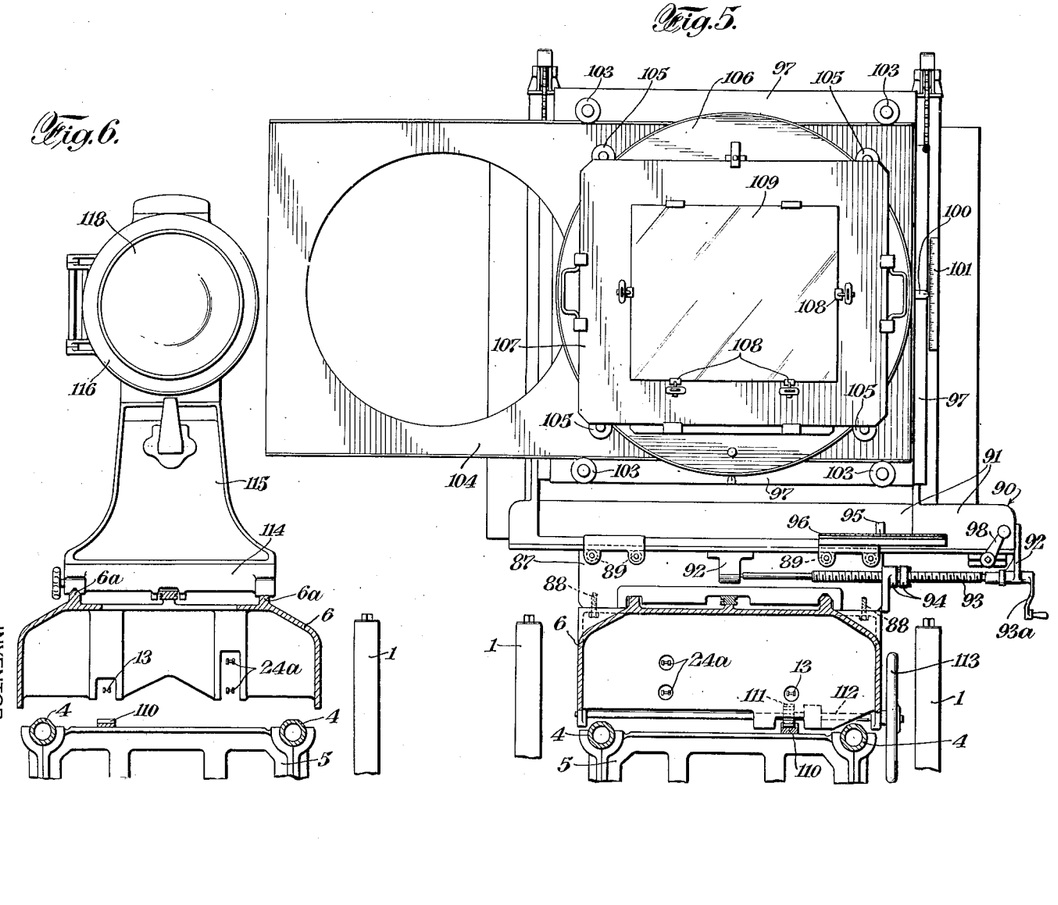
Fig. 6 is a transverse vertical sectional view, partly in elevation, taken on the line 6—6 of Fig. 1 looking in the direction of the arrows.

Referring to Figs. 1 and 6, the aforesaid tracks 6a, 6a of the carriage 6 are shown as supporting a base member 114 which, in turn, supports a housing 115 to the upper surface of which is secured a fixed housing 116 having a movable housing 117 pivoted thereto, these two housings forming the enclosure for the condenser lens assembly of the projection apparatus, the condenser lens assembly being of any suitable character and the front condenser lens being shown at 118 in Fig. 6.

Referring to Fig. 1, a shaft 119 is shown as mounted in a bearing 120 upstanding from the carriage 6, this shaft 119 having an actuating wheel 119a, and said shaft 119 being threaded into the aforesaid base member 114 of the condenser lens assembly. Accordingly, rotation of the wheel 119a in one direction or the other results in the production of desired movement of the condenser lens assembly along and with respect to the carriage 6.

In order that the condenser lens assembly may be maintained in an adjusted position as desired, there may be provided an arrangement such as illustrated in Fig. 9, for example, wherein to a transverse section such as a rib 114a of the condenser lens base member 114, there is suitably secured, as by the screws 121, an angle member 122 having a horizontal section 122a provided with an elongated slot 122b. Slidable along this slot 122b is a headed pin 123 secured to and utilizable for supporting a block 124. The slot 122b also receives, in freely slidable relation, a pair of headed pins 125 which support the upper horizontal section of an angle member 126 which has a vertical section corresponding generally with the block 124 and disposed in parallel relation with respect thereto. A suitably journalled shaft 127 carrying an actuating wheel 128 extends through horizontally alined openings formed in the block 124 and the vertical section of the member 126, the opening through the block 124 freely receiving the shaft 127 and the opening through the vertical section of the member 126 being threaded so as to coact with threads formed on the end of said shaft 127. Further, the shaft 127 has a collar 129 pinned or otherwise secured thereto, this collar coacting with the aforesaid block 124.

Extending longitudinally above the upper section of the carriage 6 and suitably secured thereto is a bar 130 with which the aforesaid block 124 and vertical section of the member 126 are adapted to coact. Thus, as clearly appears from a consideration of Fig. 9, the shaft 127 may be rotated, after the condenser lens base member 114 has been positioned as desired, in the proper direction to cause the threaded end thereof to move from left to right, Fig. 9. This action causes the vertical section of said member 126 and the block 124 to move into clamping relation with respect to the bar 130 with the result that the condenser lens base member 114 and associated parts are positively retained in the desired position on the carriage 6. Further, as will be understood, the above described clamping action occurs in an equalizing manner with the attendant advantages.

In Fig. 1, I have shown an operating wheel 131, corresponding with the above noted wheel 128, associated with the lower housing 16 of the arc lamp structure. This wheel 131, the same as the wheel 128, may control mechanism similar to that shown in Fig. 9 for positively locking the arc lamp arrangement in a desired position on the carriage 6.

Further in Fig. 1, I have shown an operating wheel 132 corresponding with the above noted wheels 128 and 131. This wheel 132 may control mechanism similar to that shown in Fig. 9 for causing the carriage 6 to be positively locked in a desired position.

As shown in Fig. 1, the lower pair of the aforesaid tubes 4 extend a substantial distance to the right beyond the upper pair of said tubes 4. In this position, said lower pair of tubes 4 have secured thereto a support 133 which carries an upstanding frame disposed between a pair of spaced, vertical posts 134. Each of said last named tubes 4, at its extreme end, carries an upstanding bracket 135 and each bracket 135 has a guy member 136 secured thereto, these guy members being secured to the aforesaid frame.

The frame last described is provided with bearings for a pair of spaced vertical jack screws 137, Fig. 2, and this frame also has secured thereto a shaft 138 provided at its respective opposite ends with bevel gears 139 which mesh with the respective bevel gears 140 carried by the jack screws 137, respectively. The shaft 138 has secured thereto a centrally disposed gear wheel 141 which meshes with a gear wheel 142 secured to one end of a shaft 143, the other end of which has a pair of pulleys 144, 145 secured thereto. Coactable with the pulley 144 is an endless belt 146 which coacts with a second pulley 147 secured to one end of a shaft 148, the other end of which has an operating hand wheel 149 secured thereto. Coactable with the pulley 145 is an endless belt 150 which coacts with a second pulley 151 carried by one end of a shaft 152, the other end of which has an operating hand wheel 153 secured thereto. It shall be understood that the shafts 143, 148, 152 and associated parts are all secured to the aforesaid frame or otherwise mounted in fixed position.

Guided for vertical movement in any suitable manner is a vertical plate 154 which, on the rear face thereof, carries a pair of nut members 155 internally threaded so as to coact with the jack screws 137, respectively. Suitably guided for horizontal movement on the plate 154 is a vertical plate 156 which has secured thereto a bracket arm 157 terminating in a lower tubular section internally threaded for the reception of a suitably supported horizontal shaft 158 having a gear wheel 159 secured to one end thereof, this gear wheel meshing with a gear wheel 160 secured to one end of a suitably supported horizontal shaft 161 which carries a worm wheel 162 with which meshes a worm 162a having extending therefrom a shaft which carries an operating hand wheel 162b. In connection with the mechanism last described, it will be understood that the shafts 158, 161 and associated mechanism move in either direction vertically in correspondence with movement of the plate 154.

The plate 156, or equivalent, is adapted to have secured thereto in suitable manner a sensitized surface or press plate which faces the objective lens so as to receive thereon a latent image of the representation appearing on the aforesaid negative plate 109. After this press plate has been secured to the plate 156, horizontal adjustment thereof may be effected as desired by manipulation of the hand wheel 162b. Further, such vertical adjustment as desired may be obtained by manipulating either the hand wheel 149 or the hand wheel 153.

The description of this application having reference to the arrangement secured to the lower pair of tubes 4 for supporting and adjusting the position of the press plate or sensitized surface is couched in general terms. It shall be understood that such an arrangement as thus generally described may be employed, or that any other equivalent or suitable press plate supporting and adjusting arrangement may be utilized as desired.

As shown in Fig. 1, there is a space between the press plate supporting structure and the adjacent end of the upper set of tubes 4. In this space, there may be disposed a bench 163 or the like, this bench extending transversely of the mechanism in convenient location for the use of the operator.

In operation, it will be understood that a press plate is secured to the plate 156 in such suitable manner that the sensitized surface thereof faces the front face of the objective lens 85. It will also be understood that a printing plate 109 is secured to the frame 107, or equivalent, in suitable manner, for example, as indicated.

By manipulation of the various hand wheels 149, 153 and 162b the plate 156 on which the press plate is directly supported may be moved as desired either horizontally or vertically so as to position said press plate as desired with respect to the projection axis of the optical system.

By manipulation of the various handles 93a and 98, Fig. 5, horizontal and vertical movement may be imparted, respectively, to the frame 107, or equivalent, which directly supports the printing plate 109 whereby the latter is suitably located with respect to said optical axis.

Assuming that the hand wheel 30 is in its retracted position so that the brake shoes 32 are in non-locking relation with respect to the hub 15a of the hand wheel 15, it will readily be understood, in view of the detailed description hereinbefore stated, that the hand wheel 15 may be rotated in a desired direction to move the carriage 6 as desired along the tracks 4. Alternatively, if desired, movement of the carriage 6 may be effected by rotation of the hand wheel 113, Figs. 2 and 5, whereby the gear wheel 111 rides along the fixed rack member 110 to produce the desired movement of said carriage 6.

Assuming that the hand wheel 30 remains in its retracted position as described above, the hand wheel 28 may be rotated in one direction or the other to thereby effect desired movement of the arc lamp housing with respect to the carriage 6.

Assuming that the hand wheel 30 is in its advanced position so that the brake shoes 32 are in clutching relation with respect to the hub 15a of the hand wheel 15, it results that the two wheels 15 and 28 are connected together and that they are movable only as a unit. Under these conditions, therefore, it will be understood that either wheel 15 or 28 may be rotated and that such rotation effects movement of the carriage 6. During such movement of the carriage 6, the arc lamp housing moves therewith but does not move with respect thereto.

While the operator stands on the bench 163, it is obvious that the hand wheel 56 may be rotated in either direction so as to thereby rotate the shaft 54 which, by the chain 69, imparts rotative movement to the shaft 71, the latter serving to move the support 73, the standards 74 and the thereby-carried objective lens 85 along the tracks 6a, 6a either toward or from the press plate on the plate 156. Alternatively, if desired, the housing 81 may be elevated to release the latch 80 whereupon the hand wheel 78, Fig. 3, may be rotated in one direction or the other to thereby effect the same focusing action on the objective lens 85.

In view of the previous description, it will be understood that the handle 35 may be actuated to thereby move the shaft 34 into binding relation with respect to the sleeve 12. This arrangement is provided so that the sleeve 12 may be releasably locked in a desired position when it becomes desirable to prevent any forward or backward movement of the carriage 6.

It will also be understood that the handle 62a may be actuated to thereby move the shaft 62 into locking engagement with respect to the shaft 54. This arrangement is thus utilized when it becomes desirable to prevent movement of the objective lens 85 from a selected position.

As hereinbefore described, it will be understood that the shaft 119, Fig. 1, may be actuated when it becomes desirable to move the condenser lens assembly either toward or from the printing plate 109.

It will also be understood that the wheels 128 and 131 are provided so that the condenser lens assembly and the arc lamp housing may positively be locked on the carriage 6. The wheel 132 is provided so that the carriage 6 may be secured in immovable manner with respect to its supporting track structure.

As hereinbefore described in detail, the mechanism of my invention comprises various counter mechanisms, indexes, etc. whereby the extent of movement of relatively fixed and movable members with respect to each other may be determined or ascertained in the necessary accurate way as required by the art.

From the foregoing, it will be understood that, by my invention there is a desired centralization of controls in the immediate vicinity of the bench 163. Accordingly, the operator, without moving from his position, may readily and quickly effect those adjustments which are necessary before proceeding with a projecting operation.

As is usual in connection with projection apparatus for producing photographic reproductions, it will be understood that the projecting light beam is produced in the upper arc lamp housing and that such light beam passes from left to right, Fig. 1, from the arc lamp, through the condenser lens assembly, through the printing plate 109 and thence to the objective lens 85 (the space between the printing plate and the objective lens being unobstructed so that the light beam may readily pass along its intended path). From the objective lens, said projecting light beam passes toward and into engagement with the sensitized plate or the plate 156.

While the invention has been described with respect to a certain particular preferred example which gives satisfactory results, it will be understood by those skilled in the art after understanding the invention, that various changes and modifications may be made without departing from the spirit and scope of the invention and it is intended therefore in the appended claims to cover all such changes and modifications.

What is claimed as new and desired to be secured by Letters Patent is:

1. In apparatus of the character described, a trackway, a carriage movable longitudinally along said trackway, a support for an arc lamp movable longitudinally along said carriage, a holder for a sensitized surface, control means positioned immediately adjacent said holder, said control means comprising a shaft arrangement extending transversely with respect to said trackway, and operating devices extending longitudinally of said trackway from said shaft arrangement to said carriage and said support, respectively.

2. In apparatus of the character described, a trackway, a carriage movable longitudinally along said trackway, a support for an arc lamp movable longitudinally along said carriage, a holder for a sensitized surface, a first control means positioned immediately adjacent said holder, said control means comprising a shaft arrangement extending transversely with respect to said trackway, operating devices extending longitudinally of said trackway from said shaft arrangement to said carriage and said support respectively, and a second control means spaced from said first control means and positioned along the side of said trackway, said second control means comprising an operating shaft extending transversely with respect to said trackway for moving said carriage independently of said first control means.

3. In apparatus of the character described, a trackway, a carriage movable longitudinally along said trackway, a support for an arc lamp movable longitudinally along said carriage, a holder for a sensitized surface, control means positioned immediately adjacent said holder, said control means comprising a shaft and sleeve arrangement having a common axis extending transversely with respect to said trackway, and operating devices extending longitudinally of said trackway from said shaft and sleeve arrangement to said carriage and said support, respectively.

4. In apparatus of the character described, a trackway, a carriage movable longitudinally along said trackway, a support for an arc lamp movable longitudinally along said carriage, a holder for a sensitized surface, control means positioned immediately adjacent said holder, said control means comprising a shaft and sleeve arrangement having a common axis extending transversely with respect to said trackway, a flexible element extending longitudinally of said trackway for connecting said shaft to said support, and another flexible element extending longitudinally of said trackway for connecting said sleeve to said carriage.

5. In apparatus of the character described, a trackway, a carriage movable longitudinally along said trackway, a support for an arc lamp movable longitudinally along said carriage, a holder for a sensitized surface, control means positioned immediately adjacent said holder, said control means comprising a shaft and sleeve arrangement having a common axis extending transversely with respect to said trackway, wheels longitudinally alined in transversely alined pairs at the opposite respective ends of said trackway, a flexible element extending longitudinally of said trackway and cooperating with one set of said wheels for connecting said shaft to said support, and another flexible element extending longitudinally of said trackway and cooperating with the other set of said wheels for connecting said sleeve to said carriage.

6. In apparatus of the character described, a trackway, a carriage movable on said trackway, means for moving said carriage back and forth along said trackway, a support for an objective lens movable on said carriage, a holder for a sensitized surface, control means positioned immediately adjacent said holder to effect movement of said support on said carriage, said control means comprising a rotatable shaft mounted in a fixed position and said movable carriage being slidably related thereto, and means whereby power is transmitted from said shaft to said support.

7. In apparatus of the character described, a trackway, a carriage movable on said trackway, means for moving said carriage back and forth along said trackway, a support for an objective lens movable on said carriage, a holder for a sensitized surface, control means positioned immediately adjacent said holder to effect movement of said support on said carriage, said control means comprising a rotatable shaft mounted in a fixed position, a gear wheel carried by said movable carriage and slidably related to said rotatable shaft, and means whereby power is transmitted from said shaft to said support.

8. In apparatus of the character described, a trackway, a carriage movable on said trackway, a support for an objective lens movable on said carriage, a holder for a sensitized surface, control means positioned immediately adjacent said holder to effect movement of said support on said carriage, said control means comprising a rotatable shaft mounted in a fixed position, a gear wheel carried by said movable carriage and slidably related to said rotatable shaft, a second shaft cooperative with said support, a gear wheel fixed to said second shaft, and a sprocket chain cooperative with said gear wheels.

9. In apparatus of the character described, a trackway, a carriage movable on said trackway, a support for an objective lens movable on said carriage, a holder for a sensitized surface, a first control means positioned immediately adjacent said holder to effect movement of said support on said carriage, said control means comprising a shaft cooperative with said support, gear means for rotating said shaft, and a second control means spaced from said first named control means, said second control means comprising an operating shaft disposed transversely of said first shaft and geared thereto.

10. In apparatus of the character described, a trackway, a carriage movable longitudinally along said trackway, a support for an arc lamp movable longitudinally along said carriage, a support for an objective lens movable longitudinally along said carriage, a holder for a sensitized surface, control means comprising separate wheels for moving said carriage along said trackway and for moving said first named and said second named supports along said carriage, said wheels being positioned closely adjacent said holder and at least one of said wheels facing said holder, and a wheel facing said last named wheel for moving said holder transversely with respect to the path of said carriage, said first named wheels on the one hand and the wheel for moving said holder on the other hand being spaced from each other so that an operator may walk between them.

ALBERT B. MUELLER.